Patented May 4, 1937

2,078,960

UNITED STATES PATENT OFFICE 2,078,960

MANUFACTURE OF NAPHTHYLAMINE DERIVATIVES

William Byres McKay, Blackley, Manchester, England, assignor to Imperial Chemical Industries Limited, a corporation of Great Britain No Drawing. Application April 11, 1935, Serial No. 15,912. In Great Britain April 18, 1934

11 Claims. (Cl. 260—128)

This invention relates to an improved method of manufacturing a composition of matter which is 1-hydroxy-alkyl-amino-5-naphthol and/or 1,5-di(hydroxy-alkyl-amino) naphthalene and which is useful in the manufacture of dyestuffs. This invention relates to an improved manufacture of 1-hydroxy-alkyl-amino-5-naphthols (see British Patent No. 410,843) and to the manufacture of new dyestuff intermediates.

It is an object of the invention to improve the method of manufacturing 1-hydroxy-alkyl-amino-5-naphthol and/or 1,5-di(hydroxy-alkyl-amino) naphthalene. Another object of the invention is to improve the method of making the alkyl-amino derivatives of 1,5-dihydroxy-naphthalene. Another object of the invention is to obtain new and improved compositions of matter.

The objects of the invention are attained, generally speaking, by reacting 1,5-dihydroxy-naphthalene with primary hydroxy-alkyl-amine in the presence of a water-soluble bisulfite in aqueous medium. The process of the invention is by causing reaction to take place between 1,5-dihydroxy-naphthalene and a primary hydroxy-alkyl-amine in presence of an aqueous solution of a water-soluble bisulfite.

The products obtained are usually a mixture of the mono-and di-substituted alkyl-amino derivatives of 1,5-dihydroxy-naphthalene. The products obtained are 1-hydroxy-alkyl-amino-5-naphthols and 1,5-di(hydroxy-alkyl-amino) naphthalenes.

Whether one or the other product preponderates depends on the proportion of reagents used and the reaction conditions. If it is desired that the preponderating derivative shall be 1-hydroxy-alkyl-amino-5-naphthol, there should be in the reaction mixture a greater amount of 1,5-dihydroxy-napthalene than of the primary hydroxy-aryl-amine. If an excess of 1,5-di(hydroxy-alkyl-amino) naphthalene is desired in the final product, there should be a greater amount of the primary hydroxy-aryl-amine than of the dihydroxy-naphthalene.

The following examples in which the parts are by weight, illustrate but do not limit the invention.

Example 1

108 parts of aqueous paste containing 44% of 1,5-dihydroxynaphthalene, 30 parts of ethanolamine, i. e. 2-hydroxyethylamine, 40 parts of a 40% aqueous solution of sodium bisulfite and 200 parts of water are mixed together and either heated and stirred in a sealed vessel at 110–115° C. for 5 hours or boiled and stirred under reflux for 10 hours. 1000 parts of water are added to the resulting mixture and sufficient 40% aqueous sodium hydroxide solution (55 parts) to make it strongly alkaline to Clayton yellow paper. The mixture is heated to boiling and cooled. 26 parts of 1,5-di-(β-hydroxyethylamino) naphthalene crystallize out and are filtered off. To the filtrate is added sufficient 36% hydrochloric acid (100 parts) to make it strongly acid to Congo red paper. It is then filtered. There is thus recovered a small amount of unchanged 1,5-dihydroxynaphthalene. Enough sodium carbonate is now added to the filtrate to give a faintly alkaline reaction on brilliant yellow paper, when 21 parts of 1-(β-hydroxyethylamino)-5-naphthol (35% yield) is precipitated. This is filtered off, washed with a little water and dried.

The 30 parts of ethanolamine and 40 parts of aqueous sodium bisulfite in the above example may be replaced by 70 parts of ethanolamine sulfite.

Example 2

314 parts of aqueous paste containing 38.3% or 1,5-dihydroxynaphthalene, 46 parts of 100% ethanolamine, i. e. 2-hydroxyethylamine, 195 parts of a 40% aqueous solution of sodium bisulfite, 128 parts of 1,5-di-(β-hydroxyethylamino)-naphthalene and 113 parts of water are mixed together and heated in a sealed vessel at 110–115° C. for 18 hours with agitation. 1500 parts of water are added to the resulting mixture and sufficient 40% aqueous sodium hydroxide solution (304 parts) to make it strongly alkaline to Clayton yellow paper. The mixture is heated to boiling and then cooled and filtered. The solid obtained is re-extracted with 750 parts of water containing sufficient caustic soda to impart to the liquor an alkaline reaction to Clayton yellow paper and the mixture is again filtered. The solid remaining consists of 130 parts of 1,5-di-(β-hydroxyethylamino-)-naphthalene. To the united filtrates is added sufficient 36% hydrochloric acid (530 parts) to make it strongly acid to Congo red paper. It is then filtered and the 1,5-dioxynaphthalene thus recovered is re-extracted with 750 parts of water to which is added a little hydrochloric acid. By filtration there is thus recovered 32 parts of unchanged 1,5-dihydroxynaphthalene. To the united filtrates is added sufficient sodium carbonate to give a faintly alkaline reaction on brilliant yellow paper, when 88 gms. of 1-β-hydroxyethylamino- 5-naphthol is precipitated. This is filtered, washed with a little water and dried.

The 1,5-di-(hydroxyethylamino) naphthalene and unchanged 1,5-dihydroxynaphthalene recovered from the above example may again be utilized for the purpose of carrying out the reaction of Example 1 or Example 2.

Other bisulfites than sodium bisulfite are useful. For instance, potassium bisulfite and calcium bisulfite alike are suitable and are exemplary of the utility which inheres in all water-soluble bisulfites. Other primary hydroxy-alkylamines can be substituted for the one specifically disclosed in the above example. The specific temperature which is recited should be taken as illustrative rather than limitative of a range of temperatures since a wide range of temperatures will yield results of a kind.

As many apparently widely different embodiments of this invention may be made without departing from the spirit and scope thereof, it is to be understood that I do not limit myself to the specific embodiments thereof except as defined in the appended claims.

I claim:

1. The method of manufacturing a composition of matter which comprises heating at 110–115° C. for five hours in a sealed vessel 108 parts of an aqueous paste containing 44% of 1,5-dihydroxy-naphthalene, 30 parts of 2-hydroxy-ethyl-amine, 40 parts of a 40% solution of sodium bisulfite, and 200 parts of water, diluting the reaction mass with 1000 parts of water after the heating, adding 55 parts of a 40% solution of sodium hydroxide, boiling, cooling, and filtering, adding 100 parts of a 36% solution of hydrochloric acid, filtering, adding sodium carbonate in quantities sufficient to give the solution a basic reaction under brilliant yellow paper, and filtering off the reaction product.

2. The method of manufacturing a composition of matter which comprises heating in confinement a mixture containing 1,5-dihydroxy-naphthalene, ethanolamine, a water-soluble bisulfite and water, after the reaction diluting the reaction mass and boiling in the presence of an alkali, cooling, filtering, acidifying, filtering, making faintly basic, and filtering off the reaction product.

3. The method of manufacturing a composition of matter which comprises reacting 1,5-dihydroxy-naphthalene and a primary hydroxy-alkylamine in the presence of an aqueous solution of a water-soluble bisulfite.

4. A composition of matter comprising essentially 1-hydroxy-alkyl-amino-5-naphthol, and 1,5-di(hydroxy-alkyl-amino) naphthalene.

5. A composition of matter comprising essentially 1-hydroxy-alkyl-amino-5-naphthol, and 1,5-di(hydroxy-alkyl-amino) naphthalene, the 1-hydroxy-alkyl-amino-5-naphthol being present in preponderating amount.

6. A composition of matter comprising essentially 1-hydroxy-alkyl-amino-5-naphthol, and 1,5-di(hydroxy-alkyl-amino) naphthalene, the 1,5-di(hydroxy-alkyl-amino) naphthalene being present in preponderating amount.

7. 1,5-di-(hydroxyalkylamino)-naphthalene.

8. 1,5-di-(hydroxyethylamino)-naphthalene.

9. The product identical with that produced by the process of claim 1.

10. The product identical with that produced by the process of claim 2.

11. The product produced by the process of claim 3.

WILLIAM BYRES McKAY.

CERTIFICATE OF CORRECTION.

Patent No. 2,078,960.

May 4, 1937.

WILLIAM BYRES McKAY.

It is hereby certified that error appears in the printed specification of the above numbered patent requiring correction as follows: Page 1, second column, line 26, for the word "or" read of; and that the said Letters Patent should be read with this correction therein that the same may conform to the record of the case in the Patent Office.

Signed and sealed this 24th day of August, A. D. 1937.

(Seal)

Leslie Frazer

Acting Commissioner of Patents.